UNITED STATES PATENT OFFICE 2,650,942

PRODUCTION OF HEXACHLOROCYCLO-PENTADIENE

Aylmer Henry Maude and David Solomon Rosenberg, Niagara Falls, N. Y., assignors to Hooker Electrochemical Company, Niagara Falls, N. Y., a corporation of New York No Drawing. Application March 20, 1951, Serial No. 216,651

13 Claims. (Cl. 260—648)

This invention is concerned with the production of hexachlorocyclopentadiene.

The manufacture of polychloropentanes is described in Patent Number 2,473,162, and the preparation of hexachlorocyclopentadiene therefrom is disclosed in Patent Number 2,509,160. According to the disclosure of Patent Number 2,509,160 the yield of hexachlorocyclopentadiene from normal pentane under carefully controlled laboratory conditions is stated to be only 54.6 per cent (Example 1) and from isopentane 54.2 per cent (Example 4) and 51.3 per cent (Example 5). Such yields from this process have been found to be too low for economical commercial manufacture of hexachlorocyclopentadiene. Moreover, said process demands a ratio of about fifteen mols of chlorine to one of pentane in order to realize the production of one mol of hexachlorocyclopentadiene in the stated yields.

We have now found a process combining the type reactions, involving substitution chlorination, dehydrochlorination, cyclization, dechlorination, and the formation of a conjugated double bond system, whereby yields of hexachlorocyclopentadiene above 90 per cent, based on a starting mixture of commercial pentane, can consistently be obtained in plant practice, without involving the use of excessive quantities of chlorine. The process of the present invention involves introducing a mixture of polychloropentanes, prepared according to the process of Patent Number 2,473,162 from commercial pentanes, for example, together with the hydrogen chloride so-produced, and chlorine, into a reaction zone maintained under conditions to produce hexachlorocyclopentadiene in the desired yield. It is truly startling that yields of hexachlorocyclopentadiene of more than 90 per cent can be obtained consistently from commercial pentanes.

The particular combination of reaction conditions of this invention producing such results involves maintaining a fore portion or first reaction zone containing a porous surface active solid at a temperature between about 300 degrees and 430 degrees centigrade and a latter portion of said zone or second zone not containing a catalyst, at a temperature between about 450 degrees and 525 degrees centigrade. We then continuously or intermittently introduce a mixture of polychloropentanes, in the vapor phase, and chlorine into the fore portion of the reaction zone. Any hydrogen chloride concomitantly produced in the chlorination of pentanes to the polychloropentanes, may be fed into the reaction zone therewith. The organic effluent from the reaction zone is then condensed and hexachlorocyclopentadiene separated from any small amount of other organic chlorinated products.

The preparation of the starting polychloropentanes employed in conducting our process is advantageously accomplished according to the procedure described in Patent Number 2,473,162. Thus, a commercial mixture of pentanes can readily be photochemically chlorinated to yield a product averaging about $C_5H_5Cl_7$, which is suitable for use in our process. It is to be noted that the patented photochemical process yields a mixture of chloropentanes, hydrogen chloride, and unreacted chlorine at about 90 degrees centigrade, for example, which can be used directly without cooling or fractionation. The exact ratios of hydrogen and chlorine in the starting polychloropentanes is not critical, but is preferably of the order of $H_3$ to $H_7$ and, conversely, $Cl_9$ to $Cl_5$. Partially chlorinated cyclic $C_5$ compounds may be employed as starting materials, as $C_5H_4Cl_6$ (hexachlorocyclopentane) or $C_5H_2Cl_6$ (hexachlorocyclopentene). Any $C_5$ chlorohydrocarbon containing more than two and preferably about five chlorine atoms may be employed in practicing our invention.

The porous inorganic solid employed in the fore portion of the reaction zone can be pretreated by various techniques, such as, extrusion under pressure, acid extraction, impregnation with various salts, etc, whereby enhanced results are obtained in this invention. Materials, selected from the group of silica gel, acid-extracted bauxite, pumice, active carbon, kieselguhr brick, acid-extracted kieselguhr brick, fuller's earth or floridin or attapulgite, diatomaceous earths and the foregoing solids impregnated with the metallic chlorides of iron, nickel and cobalt, are suitable porous surface active solids for use in this invention. These solids all have extensive surface areas and are substantially unaffected chemically during their life in the reaction zone. They tend to become ineffective in use, probably due to reduction in porosity, and must be periodically replaced by fresh material. In general, the low cost of such solids renders it uneconomic to regenerate them when spent, but this can be done if desired.

The porous solids may be impregnated with the chloride salts of various metals, for example, iron, cobalt or nickel, which are metals of group VIII of the periodic table. For example, ten per cent by weight of ferric chloride or floridin has been found very satisfactory in practicing our invention.

It is desirable to provide about 200 cubic centimeters of porous solid per gram mol of vapor feed introduced per hour into the packed portion of the reaction zone. The solid is packed loosely in the fore portion of the zone and is preferably of such particle size that the pressure due to resistance to flow of gases through the zone is not excessive. For example, in a zone having a cross-sectional area of one or two square inches, eight to sixteen mesh floridin has been used. In a zone having a cross-sectional area of about 100 square inches, a two or four mesh porous solid may be used. The porous solid may be employed in the "fluidized" condition and will then be of small particle size or in a supported bed.

The temperatures in the reaction zone are important and the fore portion of the zone which contains the porous solid must be maintained between 300 degrees and 430 degrees centigrade; below 300 degrees centigrade chlorination, cyclization, and diene formation fall off rapidly and above 430 degrees centigrade chlorinolysis occurs to a marked extent. The preferred range of temperatures wherein we have obtained the best results is between about 350 degrees and 400 degrees centigrade. The most desirable temperature for any particular starting material is that low enough for a minimum of chlorinolysis and high enough to reduce to a minimum, hydrogen-containing organic product. The porous solid in the fore portion of the reaction zone is advantageously graded with lower activity material where the reactant vapors first contact it to avoid excessively rapid exothermic reaction with resulting temperatures above the range indicated whereby chlorinolysis would result.

The temperatures in the latter or second portion of the reaction zone, not containing the solid packing, must be maintained between 450 degrees and 525 degrees centigrade. In commercial practice we have found that a temperature of about 500 degrees centigrade, plus or minus about fifteen degrees centigrade is very satisfactory. This temperature can be maintained by immersing the portion of the tube or other apparatus defining the latter portion of the reaction zone in a molten bath such as sodium nitrate.

The reactants are introduced into the reaction zone in the vapor phase and come into contact with the porous solid. The contact time in the fore portion of the zone is between about three and about eight seconds. This period must be long enough to accomplish chlorination, cyclization and diene formation, but not so prolonged as to initiate the formation of undesirable products. The contact time in the latter higher temperature portion of the reaction zone may be from about five seconds to about one-half of a minute and is not as critical as the length of the time period in the porous solid portion of the zone. The over-all result is the making of hexachlorocyclopentadiene in high yield with a minimum chlorine consumption, from inexpensive organics, by subjecting the reactants, in a reaction zone, to increasing temperatures, initially under the influence of a porous solid, and then in the absence of such solids.

While we have described our process as being conducted in a reaction zone composed of a single tube or other chamber, it may be carried out in a series of two or more zones or chambers arranged for transfer of at least the condensable materials from the first to the second, provided all or any of the reactants are first contacted with a porous inorganic solid in the temperature range recited and passed into the portion of the reaction zone not containing a porous solid, as described, and other conditions recited herein are observed.

The undesirable effects of localized overheating in the fore portion of the reaction zone containing the porous solid, whereby chlorinolysis is effected, may be minimized by diluting the gaseous reactants with an inert diluent. Hydrogen chloride concomitantly produced with the polychloropentanes may be conveniently and advantageously used as an effective diluent for this purpose, however, other diluents can be used. The effect of using hydrogen chloride as the inert diluent is illustrated by the fact that about ten per cent decrease in undesirable chlorinolysis products is realized when the gaseous reactants introduced into the reaction zone are diluted to about fifty mol per cent.

The theoretical quantity of chlorine necessary for effecting the conversion of one mol of pentane to one mol of hexachlorocyclopentadiene is nine mols of chlorine per mol of pentane. By continuously transferring the entire effluent of the photochemical chlorinator into the fore part of the reaction zone of this invention we have found that this theoretical ratio is closely approached in that in actual plant practice only about ten mols of chlorine per mol of commercial pentane is necessary in order to realize the high yields of desired hexachlorocyclopentadiene of this invention. This is in contrast with the procedure of the prior art as exemplified by Patent Number 2,509,160 wherein it is shown in Example 1 that approximately fifteen mols of chlorine per mol of n-pentane was necessary to make one mol of hexachlorocyclopentadiene.

The following examples are illustrative of the practice of our invention:

EXAMPLE I

*Part 1*

Chlorine and commercial pentane containing 90 per cent n-pentane and about eight per cent iso-pentane were continuously introduced, in a mol ratio of about 10.7 to 1.0, into a photochemical chlorinator similar to that described in Patent Number 2,473,162. The chlorination of the hydrocarbon was effected at a temperature of about 90 degrees centigrade, in accordance with the disclosure in said patent, whereby a chlorinator effluent was produced which contained gaseous hydrogen chloride, gaseous chlorine and liquid polychloropentanes of the average formula $C_5H_5Cl_7$, having a specific gravity of 1.67, in a mol ratio of 7.1 to 3.56 to 1.0, respectively.

*Part 2*

The photochemical chlorinator effluent, including liquid and gas, produced in accordance with Part 1 was completely vaporized and continuously passed into a nickel reactor tube packed in the fore portion with 110 cubic centimeters of eight to sixteen mesh floridin per gram mol of vapor fed per hour. The vaporized feed was exposed in the packed portion of the reaction zone, which was maintained at a temperature between about 350 degrees and 400 degrees centigrade, for a contact time of about six seconds. The gaseous effluent from the fore portion of the reaction zone was continuously transferred into the latter portion of the reaction zone, which was maintained at a temperature of about 500 degrees centigrade, and retained therein for a contact time of about twenty-five seconds. The latter portion of the zone contained no porous solid. The organic effluent produced was condensed and analyzed about 90 mol per cent hexachlorocyclopentadiene which represented a 90 per cent yield of hexachlorocyclopentadiene based on the pentanes introduced into the photochemical chlorinator of Part 1.

In a manner after Part 2 of the foregoing example, using polychloropentanes similar to that produced in Part 1, the following results were obtained under the conditions stated in the subsequent examples:

EXAMPLE II

An eighty-six mol per cent yield of hexachlorocyclopentadiene was obtained, with only about a ten to one mol ratio of chlorine to commercial pentane, using about seven mols of hydrogen chloride diluent per mol of organic, when the porous solid was Florida fuller's earth or floridin, impregnated with iron chloride. The temperatures in the packed and unpacked portions of the reaction zone were maintained at about 380 degrees and 475 degrees centigrade, respectively. About 645 cubic centimeters of solid per gram mol of vapors fed were present and the retention time in the packed and unpacked portion of the reaction zone were four seconds and twenty-one seconds, respectively.

EXAMPLE III

A ninety-one and two-tenths mol per cent yield of hexachlorocyclopentadiene was obtained using pressure activated floridin in the fore portion of the zone, which was graded according to the length of time it has been in use in this process, and packed in the reaction zone so that the vapors introduced, contacted the oldest solid, and the vapors leaving the packed zone contacted new material. Gaseous hydrogen chloride diluent was present with the reactants and the temperature in the packed portion of the zone was maintained at about 330 degrees centigrade. About 220 cubic centimeters of solid per gram mol of gas fed per hour were used and the retention time in the fore portion was held at seven seconds; other conditions not defined, being substantially equivalent to those of Example I.

Similarly high yields of hexachlorocyclopentadiene can be obtained in accordance with the foregoing examples, using the various other porous solids already defined herein, under the conditions outlined. It is to be understood that we do not intend to be limited to the specific conditions recited, except as defined in the appended claims, because it is apparent to those skilled in the art that changing one variable in the inventive art described, will necessitate a mere compensating adjustment in another variable, whereby best results can be obtained. For instance, we have found that by using a highly chlorinated polychloropentane as the starting material, less localized heating in the fore portion of the reaction zone is experienced thus minimizing and eliminating the need for large amounts of gaseous diluent for accurate temperature control. Further, after prolonged operation using a given quantity of catalyst, changes in reaction temperature, retention time, and the other conditions, will be indicated, and adjustments in these are made, based on the best economic balance involving the various factors concerned.

We claim:
1. The process which includes: passing a vapor phase mixture $C_5$ chlorohydrocarbon containing more than two chlorine atoms per molecule and chlorine in at least the theoretical quantity required to produce hexachlorocyclopentadiene into contact with a porous surface active inorganic solid in the fore portion of a reaction zone, said zone being maintained at a starting temperature in the said fore portion from above 300 degrees centigrade and below about 430 degrees centigrade to a final temperature in a latter unpacked portion of the reaction zone above 450 degrees centigrade and below about 525 degrees centigrade; and, separating hexachlorocyclopentadiene from the reaction zone effluent.

2. The process of claim 1 wherein the reactants are diluted with hydrogen chloride.

3. The process of claim 1 wherein the porous inorganic solid is fuller's earth.

4. The process of claim 3 wherein the fuller's earth is fluoridin.

5. The process of claim 4 wherein the floridin is pressure activated.

6. The process of claim 1 wherein the porous inorganic solid is activated bauxite.

7. The process of claim 1 wherein the porous inorganic solid is impregnated with a chloride of a metal selected from the group consisting of cobalt, nickel and iron.

8. The process of claim 7 wherein the metallic chloride is iron chloride.

9. The process of claim 1 wherein the $C_5$ chlorohydrocarbon is polychloropentane containing between about five and nine chlorine atoms per molecule.

10. The process of claim 1 wherein the $C_5$ chlorohydrocarbon is a mixture of polychloropentanes of average formula $C_5H_5Cl_7$ and wherein the mol ratio of chlorine to said $C_5$ chlorohydrocarbon is about three and one-half to one.

11. The process of claim 1 wherein the porous inorganic solid is arranged in the fore portion of the reaction zone so that incoming reactant vapors contact a porous inorganic solid which has been used in the process, before contacting more active porous inorganic solids at a point removed from the entrance point of the vapors into the reaction zone.

12. The process of claim 1 wherein the reaction zone is separated into two chambers.

13. The process of claim 1 wherein said fore portion and said latter unpacked portion of the reaction zone are contained in substantially one chamber.

AYLMER HENRY MAUDE.
DAVID SOLOMON ROSENBERG.

References Cited in the file of this patent
UNITED STATES PATENTS

| Number | Name | Date |
|---|---|---|
| 1,947,491 | Reilly | Feb. 1, 1933 |
| 2,280,928 | Pie | Apr. 28, 1942 |
| 2,509,160 | McBee et al. | May 23, 1950 |

OTHER REFERENCES

Fruhwirth, "Ber. der deut. chem. Gesell.," vol. 74, pages 1700–1 (1941).

Krynitsky, "Jour. Amer. Chem. Soc.," vol. 69, pages 1918–20 (1947).